United States Patent
Camp, Jr. et al.

(10) Patent No.: US 8,145,004 B2
(45) Date of Patent: Mar. 27, 2012

(54) SYSTEM AND METHOD FOR GENERATING A PHOTOGRAPH

(75) Inventors: William O. Camp, Jr., Chapel Hill, NC (US); Walter M. Marcinkiewicz, Chapel Hill, NC (US); Toby J. Bowen, Durham, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 875 days.

(21) Appl. No.: 12/127,074

(22) Filed: May 27, 2008

(65) Prior Publication Data

US 2009/0297063 A1    Dec. 3, 2009

(51) Int. Cl.
G06T 5/00 (2006.01)
G03B 41/02 (2006.01)

(52) U.S. Cl. .................... 382/254; 396/322
(58) Field of Classification Search .............. None
See application file for complete search history.

(56) References Cited

U.S. PATENT DOCUMENTS

| | | | | |
|---|---|---|---|---|
| 4,370,641 | A * | 1/1983 | Kantor et al. | 382/289 |
| 6,320,618 | B1 | 11/2001 | Aoyama | |
| 2004/0095492 | A1* | 5/2004 | Baxter et al. | 348/302 |
| 2005/0008255 | A1* | 1/2005 | Aiso | 382/284 |
| 2007/0182840 | A1* | 8/2007 | Monroe | 348/335 |
| 2008/0030592 | A1* | 2/2008 | Border et al. | 348/218.1 |
| 2008/0213935 | A1* | 9/2008 | Tsukamoto | 438/60 |
| 2009/0220173 | A1* | 9/2009 | Wajs | 382/284 |

FOREIGN PATENT DOCUMENTS

| | | |
|---|---|---|
| JP | 11155096 | 6/1999 |
| JP | 2002040145 | 2/2002 |

OTHER PUBLICATIONS

Min Kyu Park et al., "Super-Resolution Image Reconstruction: A Technical Overview", (2003), IEEE Signal Processing Magazine, XP011097476, vol. 20, No. 3, pp. 21-36.
Koo Y et al., "An Image Resolution Enhancing Technique using Adaptive Sub-Pixel Interpolation for Digital Still Camera System", (1999), IEEE Transactions on Consumer Electronics, XP000888363, vol. 45, No. 1, pp. 118-123.
International Search Report and Written Opinion from corresponding International Application No. PCT/US08/84811.

* cited by examiner

*Primary Examiner* — Jason M Repko
*Assistant Examiner* — David F Dunphy
(74) *Attorney, Agent, or Firm* — Renner, Otto, Boisselle & Sklar, LLP (57) ABSTRACT

A camera assembly for generating high resolution photograph includes a sensor assembly that has two regions of different effective resolution. Image data from multiple images that are captured with the sensor assembly are combined to generate output image data in the form of a high resolution picture. A first region of the sensor is used to capture image data for the images that are combined. A second region, that is of higher effective resolution than the first region, is used to capture image data for use in aligning the image data from the plural images prior to combination.

17 Claims, 8 Drawing Sheets

SYSTEM AND METHOD FOR GENERATING A PHOTOGRAPH

TECHNICAL FIELD OF THE INVENTION

The technology of the present disclosure relates generally to photography and, more particularly, to a system and method for combining multiple digital images of a scene to produce a high resolution output photograph.

BACKGROUND

Mobile and/or wireless electronic devices are becoming increasingly popular. For example, mobile telephones, portable media players and portable gaming devices are now in wide-spread use. In addition, the features associated with certain types of electronic devices have become increasingly diverse. For example, many mobile telephones now include cameras that are capable of capturing still images and video images.

The imaging devices associated with many portable electronic devices are becoming easier to use and are capable of taking reasonably high-quality photographs. Even still, there is an ever present desire to increase the resolution capability of cameras in portable devices. But space in many portable devices, such as mobile telephones, limits the size of a camera sensor and of imaging optics. Therefore, the overall performance capability of these imaging devices is corresponding limited.

SUMMARY

The present disclosure describes a system and method of generating a photograph of high resolution using a sensor assembly that has two regions of different effective resolution. Image data from multiple images that are captured with the sensor assembly are combined to generate output image data in the form of a high resolution picture. A first region of the sensor is used to capture image data for the images that are combined. A second region, that is of higher effective resolution than the first region, is used to capture image data for use in aligning the image data from the plural images prior to combination. In some embodiments, the image data from the second region may be included in image data for the output photograph.

According to one aspect of the disclosure, a camera assembly includes a sensor assembly that includes an image capture component and an image alignment component, the image alignment component having higher effective resolution than the image capture component; and a controller that controls the generation of an output photograph. The controller is configured to control the sensor assembly to capture at least two images; identify at least one alignment feature in image data corresponding to a first of the images; identify the at least one alignment feature in the image data from the image alignment component and corresponding to a second one of the images and determine an offset between the first and second images from corresponding locations of the alignment feature in the first and second images; align the first and second images to remove offset corresponding to an integer multiple of a predetermined pixel pitch and leave an offset amount corresponding to a residual fraction of the pixel pitch; and combine the image data from the image capture component for the first image with the image data from the image capture component for the second image.

According to one embodiment of the camera assembly, the resolution of the output photograph is greater than a native resolution of the image capture component.

According to one embodiment of the camera assembly, the image data is combined using interpolation.

According to one embodiment of the camera assembly, the image alignment component has a higher density of photo sensors per unit area than the image alignment component.

According to one embodiment of the camera assembly, the image alignment component is located at a periphery of the image capture component.

According to one embodiment of the camera assembly, a pitch of photo sensors of the image capture component is a multiple of a pitch of photo sensors of the image alignment component.

According to one embodiment of the camera assembly, the predetermined pixel pitch is a pitch of photo sensors of the image alignment component.

According to one embodiment of the camera assembly, the image data from the image alignment component for the first image populates a corresponding portion of the output photograph.

According to one embodiment, the camera assembly further includes a memory having a pixel resolution for the output photograph that is a function of a resolution of the image alignment component, the controller populating the memory with the combination of the image data from the captured images.

According to one embodiment of the camera assembly, the identified alignment feature from the first image is from the image data output by the image alignment component.

According to one embodiment of the camera assembly, the image alignment component is a Vernier sensing element located adjacent the image capture component.

According to one embodiment of the camera assembly, the predetermined pixel pitch is a pitch of photo sensors of the image capture component.

According to one embodiment of the camera assembly, the identified alignment feature from the first image is from the image data output by the image capture component.

According to one embodiment of the camera assembly, the image alignment component and the image capture component have different optical pathways to focus light from a scene respectively onto the image alignment component and the image capture component.

According to one embodiment of the camera assembly, the optical pathway for the image alignment component has a higher magnification than the optical pathway for the image capture component.

According to one embodiment of the camera assembly, the predetermined pixel pitch is a pitch of photo sensors of the image alignment component.

According to another aspect of the disclosure, a method of generating a photograph includes controlling a sensor assembly to capture at least two images, the sensor assembly having an image capture component and an image alignment component, the image alignment component having higher effective resolution than the image capture component; identifying at least one alignment feature in image data corresponding to a first of the images; identifying the at least one alignment feature in the image data from the image alignment component and corresponding to a second one of the images and determining an offset between the first and second images from corresponding locations of the alignment feature in the first and second images; aligning the first and second images to remove offset corresponding to an integer multiple of a predetermined pixel pitch and leave an offset amount corresponding to a residual fraction of the pixel pitch; and combining the image data from the image capture component for the first image with the image data from the image capture component for the second image.

According to one embodiment of the method, the image alignment component has a higher density of photo sensors per unit area than the image alignment component.

According to one embodiment of the method, the image alignment component is a Vernier sensing element located adjacent the image capture component.

According to one embodiment of the method, the image alignment component and the image capture component have different optical pathways to focus light from a scene respectively onto the image alignment component and the image capture component.

These and further features will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the scope of the claims appended hereto.

Features that are described and/or illustrated with respect to one embodiment may be used in the same way or in a similar way in one or more other embodiments and/or in combination with or instead of the features of the other embodiments.

BRIEF DESCRIPTION OF THE DRAWINGS

FIGS. 6A through 6D represent the progression of combining image data from multiple images captured with the sensor assembly of FIG. 5 where FIG. 6A represents an enlarged, partial photo sensor layout and corresponding image data for a first image, FIG. 6B represents the partial photo sensor layout and corresponding image data for a second image, FIG. 6C represents partial image data from the first and second images that have been aligned, and FIG. 6D represents partial image data for an output photograph that results from a combination of the image data from the first and second images;

DETAILED DESCRIPTION OF EMBODIMENTS

Embodiments will now be described with reference to the drawings, wherein like reference numerals are used to refer to like elements throughout. It will be understood that the figures are not necessarily to scale.

Described below in conjunction with the appended figures are various embodiments of a system and a method for generating a photograph. In the illustrated embodiments, the photograph generation is carried out by a device that includes a digital camera assembly used to capture image data in the form of still images. It will be understood that the image data may be captured by one device and then transferred to another device that carries out the photograph generation. It also will be understood that the camera assembly may be capable of capturing video images in addition to still images.

The photograph generation will be primarily described in the context of processing image data captured by a digital camera that is made part of a mobile telephone. It will be appreciated that the photograph generation may be carried out in other operational contexts such as, but not limited to, a dedicated camera or another type of electronic device that has a camera (e.g., a personal digital assistant (PDA), a media player, a gaming device, a "web" camera, a computer, etc.). Also, the photograph generation may be carried out by a device that processes existing image data, such as by a computer that accesses stored image data from a data storage medium or that receives image data over a communication link.

Figure 1:
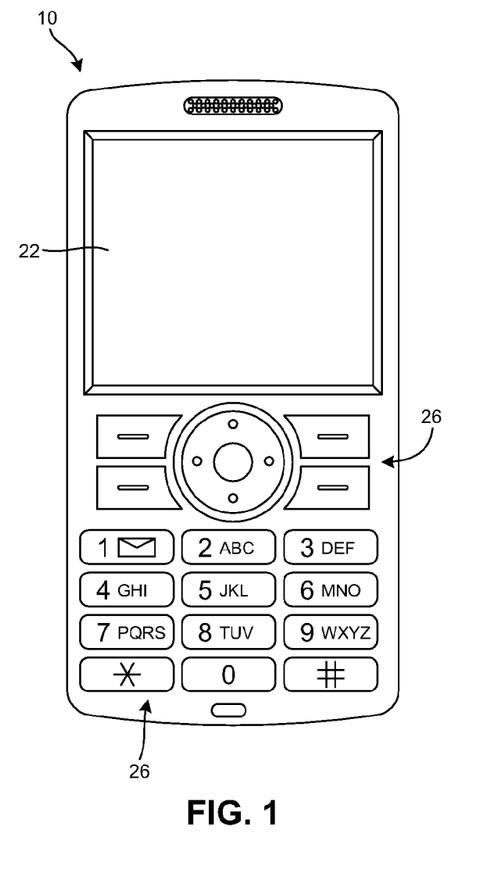
FIGS. 1 and 2 are respectively a front view and a rear view of an exemplary electronic device that includes a representative camera assembly.
Figure 2:
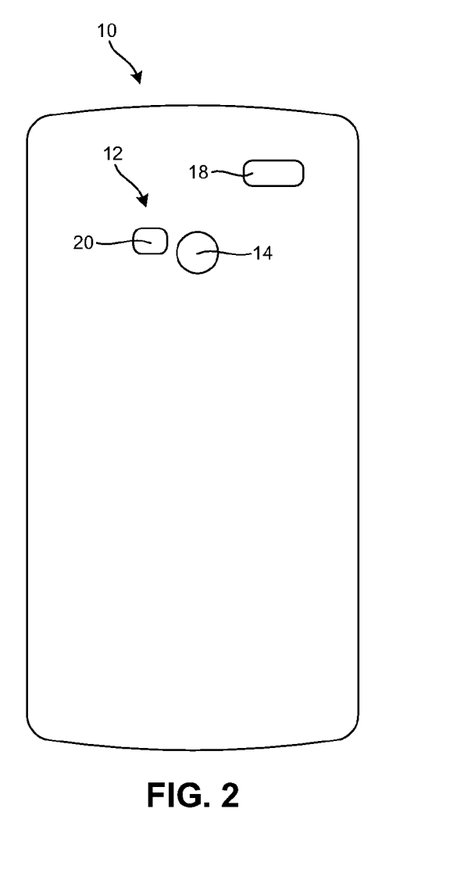

Referring initially to FIGS. 1 and 2, an electronic device 10 is shown. The illustrated electronic device 10 is a mobile telephone. The electronic device 10 includes a camera assembly 12 for taking digital still pictures and/or digital video clips. It is emphasized that the electronic device 10 need not be a mobile telephone, but could be a dedicated camera or some other device as indicated above.

Figure 3:
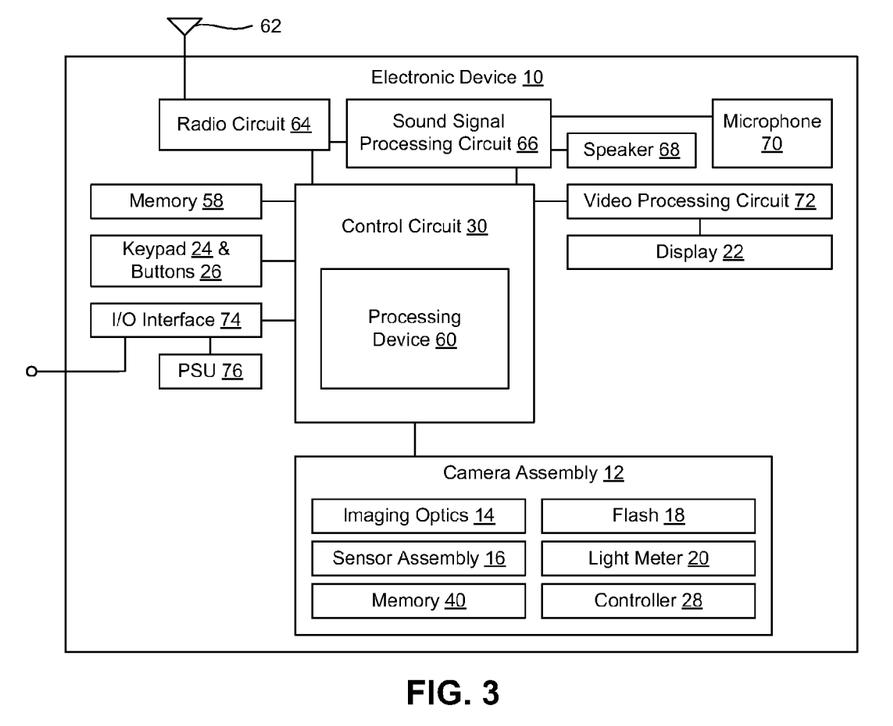
FIG. 3 is a schematic block diagram of the electronic device of FIGS. 1 and 2.

With reference to FIGS. 1 through 3, the camera assembly 12 may be arranged as a typical camera assembly that includes imaging optics 14 to focus light from a scene within the field of view of the camera assembly 12 onto a sensor assembly 16. The sensor assembly 16 converts the incident light into image data that may be processed using the techniques described in this disclosure. The imaging optics 14 may include a lens assembly and components that that supplement the lens assembly, such as a protective window, a filter, a prism, a mirror, focusing and/or zooming mechanics, focusing and/or zooming control electronics, etc.

Other camera assembly 12 components may include a flash 18, a light meter 20, a display 22 for functioning as an electronic viewfinder and as part of an interactive user interface, a keypad 24 and/or buttons 26 for accepting user inputs, an optical viewfinder (not shown), and any other components commonly associated with cameras.

Another component of the camera assembly 12 may be an electronic controller 28 that controls operation of the camera assembly 12. The controller 28, or a separate circuit (e.g., a dedicated image data processor), may carry out the photograph generation. The electrical assembly that carries out the photograph generation may be embodied, for example, as a processor that executes logical instructions that are stored by an associated memory, as firmware, as an arrangement of dedicated circuit components or as a combination of these embodiments. Thus, the photograph generation technique may be physically embodied as executable code (e.g., software) that is stored on a machine readable medium or the photograph generation technique may be physically embodied as part of an electrical circuit. In another embodiment, the functions of the electronic controller 28 may be carried out by a control circuit 30 that is responsible for overall operation of the electronic device 10. In that case, the controller 28 may be omitted. In another embodiment, camera assembly 12 control functions may be distributed between the controller 28 and the control circuit 30.

In the below described exemplary embodiments of generating a digital photograph, two images that are taken in relatively rapid succession are used to construct the photograph. It will be appreciated that more than two images may be used. For instance, in one embodiment, the photograph is generated from about ten images that are taken in less than about 125 milliseconds or, in another embodiment, in less than about 250 milliseconds. Therefore, when reference is made to images that are combined to generate a photograph, the term images explicitly refers to two images or more than two images.

With additional reference to FIGS. 5 through 9, exemplary techniques for generating a photograph are described. It will be appreciated that through the description of the exemplary techniques, a description of steps that may be carried out by executing software is described. The described steps are the foundation from which a programmer of ordinary skill in the art may write code to implement the described functionality. As such, a computer program listing is omitted for the sake of brevity. However, the described steps may be considered an algorithm that the controller 28 and/or 30, or some other processor, is configured to carry out.

Figure 5:
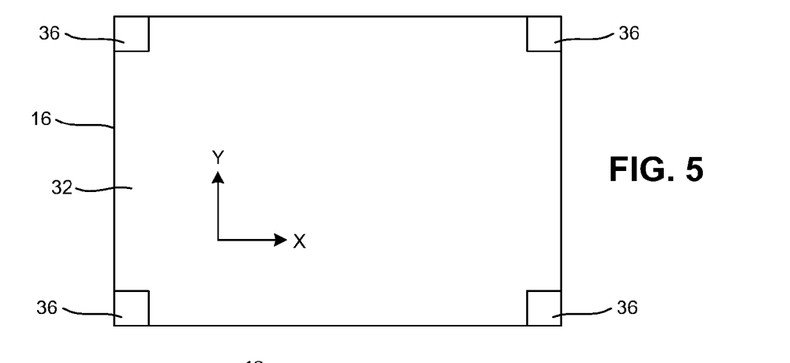
FIG. 5 is a schematic view of a first exemplary sensor assembly for the camera assembly.
Figure 6A:
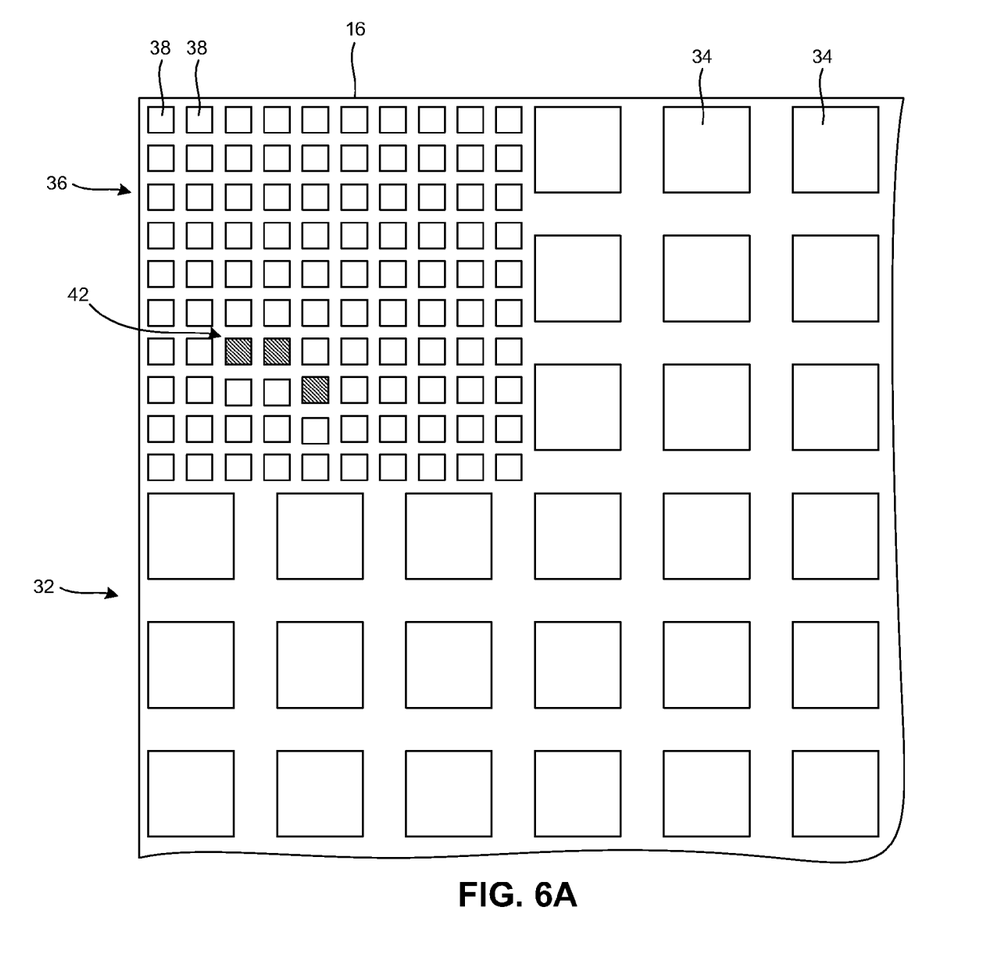

FIG. 5 shows a first exemplary embodiment of the sensor assembly 16 that may be used in the generation of the photograph. FIG. 6A shows an enlarged portion of the sensor assembly 16 of FIG. 5. The sensor assembly 16 includes a first component that is configured as an image capture component 32. The image capture component 32 contains an arrangement of photo sensors 34, which are individual light sensitive areas that each output image data for a corresponding portion of the field of view of the camera assembly 12 when an image is captured. In one embodiment, the photo sensors 34, which also may be referred to as pixels, are generally arranged in rows and columns. As will become more apparent below, the size and/or shape of each photo sensor 34 and the pitch of the photo sensors 34 from the image capture component 32 may be selected to facilitate generation of the photograph from plural captured images.

The sensor assembly 16 further includes a second component that is configured as an image alignment component 36. Similar to the image capture component 32, the image alignment component 36 contains an arrangement of photo sensors 38. In one embodiment, the photo sensors 38, which also may be referred to as pixels, of the image alignment component 36 are generally arranged in rows and columns. As will become more apparent below, the size and/or shape of each photo sensor 38 and the pitch of the photo sensors 38 from the image capture component 32 may be selected to facilitate generation of the photograph from plural captured images. The photo sensors 38 from the image alignment portion 36 need not be arranged contiguously. For instance, as shown in the illustrated example, groups of photo sensors 38 are placed at each corner of the sensor assembly 16 to collectively form the image alignment component 36. In other exemplary arrangements, the photo sensors 38 may be placed along edges of the sensor assembly 16 or in other designated areas within the field of photo sensors 34 from the image capture component 32.

The density of the photo sensors 38 in terms of number of photo sensors 38 per unit area is higher than the density of the photo sensors 34 in terms of number of photo sensors 34 per unit area. Therefore, the effective resolution of the image alignment component 36 is higher than the effective resolution of the image capture component 32. In one embodiment, for example, there may be about one hundred photo sensors 38 per square millimeter and there may be about ten photo sensors 34 per square millimeter. The size of the image alignment component 36 relative to the size of the image capture component 32 may be small. In one embodiment, for example, the image alignment component 36 may be about one percent or less in size relative to the image capture component 34. In one embodiment, the pixel pitch of the photo sensors 34 may be a multiple of the pixel pitch of the photo sensors 38. The sensor assembly 16 may be considered a two dimension arrangement designated by a horizontal "x" direction and a vertical "y" direction as illustrated in FIG. 5.

In a preferred embodiment, the photo sensors 34 and 38 are configured to generate color image data, such as red, green, blue (RGB) image data. In one embodiment, the photo sensors 38 may be monochromatic that output image data in grey-scale.

Due to the relatively high density of photo sensors 38, the portions of the sensor assembly 12 that make up the image alignment component 36 are preferably arranged at the corners and/or edges of the sensor assembly 12. This arrangement facilitates electrical connection to the photo sensors 38 and the arrangement of support logic (e.g., transistor placement). In one embodiment, space between photo sensors 34 of the image capture component 32 may be used for wiring and/or logic components for the photo sensors 38. In another embodiment, space between photo sensors 34 of the image capture component 32 may be used to accommodate infrared photo sensors that may be used to capture image data in low light situations. The image data from the infrared sensors may be used instead of or as a supplement to image data from the photo sensors 34 and/or photo sensors 38 in low light situations.

The technique for generating the photograph may begin when a user commands the taking of a photograph, such as by depressing a shutter release button. In response, the camera assembly 12 may capture a first of a plurality of images that are combined to generate the photograph. As indicated, for purposes of explanation, a photograph will be described by combining image data from two images. But it will be appreciated that the technique may be extended to combining any number of images.

FIG. 6A shows the exemplary photo sensor 34, 38 arrangement of the sensor assembly 16, may further be considered to be a logical representation of the image data generated by each photo sensor 34 and 38 for the first image. That is, for each photo sensor 34, 38, there is corresponding image data. This image data may be stored, at least temporarily, in a memory 40 (FIG. 3) that is associated with the camera assembly 12.

Figure 6B:
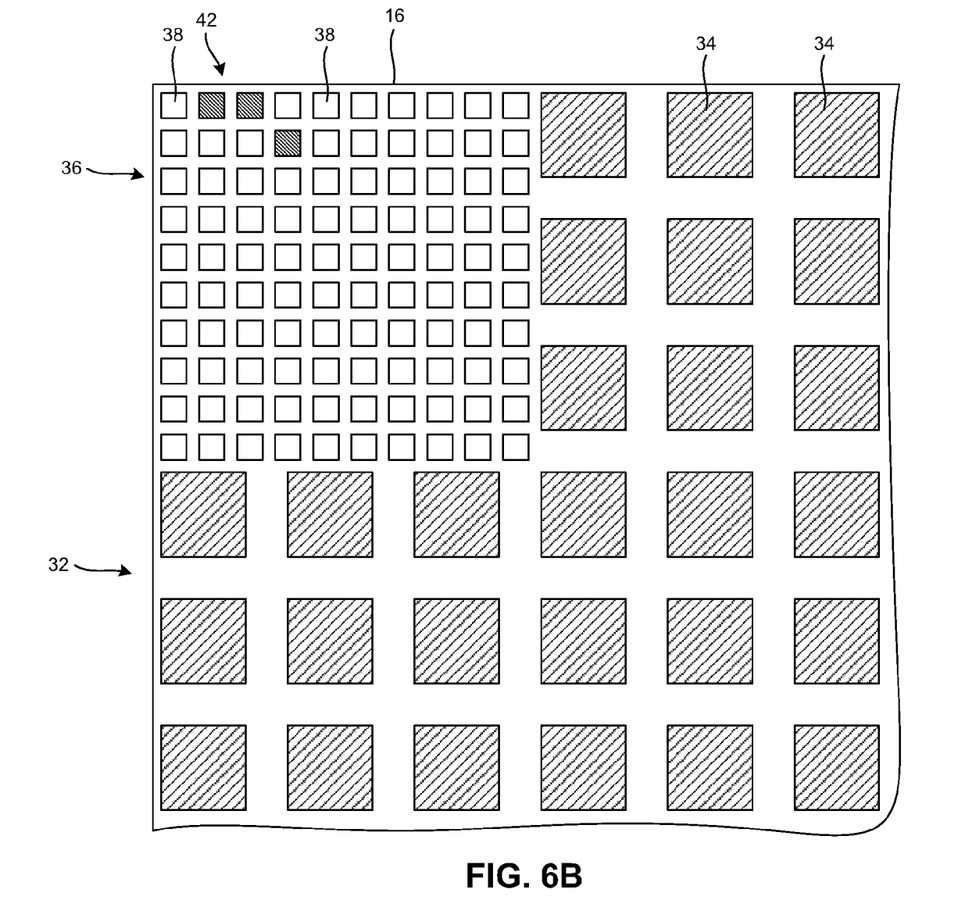

With additional reference to FIG. 6B, a second image may be captured following capturing of the first image. It will be appreciated that the order of capturing the first and second images may be reversed. FIG. 6B shows the exemplary photo sensor 34, 38 arrangement of the sensor assembly 16 and may further be considered to be a logical representation of the image data generated by each photo sensor 34 and 38 for the second image. That is, for each photo sensor 34, 38, there is corresponding image data. This image data may be stored, at least temporarily, in a memory 40 that is associated with the camera assembly 12. The process of capturing images and storing corresponding image data may be repeated for a desired number of images. The capturing may be conducted at a predetermined capture rate. Each image may be captured using a predetermined exposure time and there may be a predetermined total exposure time for all of the captured images. The image data from the image capture component 32 for the second image is shown using cross-hatching to distinguish the image data from the second image with the image data from the first image.

During the process of capturing plural images, it is predicted that the camera assembly 12 may move slightly from image to image. The movement may be caused by hand shake of the user or other vibration input. The movement from image to image, if any, is not expected to be very large. While the movement may not be large, the field of view of the camera assembly 12 may shift slightly. Due to this shifting, image data corresponding to a feature in the field of view may be present in both the first and second images, but the image data for the feature may be captured with different photo sensors 34, 38 from image to image. For example, there may be an offset in terms of the y direction and/or the x direction in the photo sensors 34 that capture the feature in the first image versus the photo sensors 34 that capture the same feature in the second image. There also may be rotation and/or tilting of the sensor assembly 16.

As will be explained, the offset present in the image alignment component 36 may be used to align the image data from the images with respect to each other. Then, residual offset present in the image data from the image capture component 32 for the images may be used to generate the resulting photograph that has higher resolution than the native (e.g., raw) image data for any one of the images.

Using the image data for the first image, one or more features that are present in the image data from the image alignment component 36 are identified. In the illustrated example of FIG. 6A, three image data pixels are shaded to represent an identified feature, referred to as an alignment feature 42. Each identified alignment feature 42 may correspond to one or more than one of the photo sensors 38 of the image alignment component 36.

Next, pattern recognition may be used to search the image data produced by the image alignment component 36 for the second image (and any subsequent images) for at least one of the identified alignment features 42 from the first image. In the exemplary illustration of FIG. 6B, the alignment feature 42 is present, but the alignment feature 42 has shifted relative to the location of the alignment feature 42 in the image data for the first image (FIG. 6A). In the example, the alignment feature 42 moved upward in the y direction by six of the relatively high density photo sensors 38 from the image alignment component 36 and shifted left in the x direction by one of the relatively high density photo sensors 38 from the image alignment component 36. While one alignment feature 42 from one portion of the image alignment component 36 is illustrated, it will be understood that identifying the offset from image to image may include searching for and, when identified, analyzing relative movement of alignment features 42 in more than one portion of the image alignment component 36. In this manner, horizontal movement, vertical movement, and/or rotational movement relative to the position of the sensor assembly 12 when the first image was captured may be identified and quantified. Rotational movement may include x-y rotation and/or pivoting of the x-y plane in a transverse "z" direction. In the illustrated example, the offset is shown as being in integer steps based on the pitch of the photo sensors 38. It will be recognized that the movement may include fractional offset. Interpolation of the image data from image to image may be used to identify such fractional offset.

If the alignment feature or features 42 that are identified in the first image are not identifiable in the second image, a conclusion may be made that the shift in the camera assembly 12 was so great that there is little correspondence between the images. In this event, the second image may not be used in the subsequent generation of the output photograph.

Figure 6C:
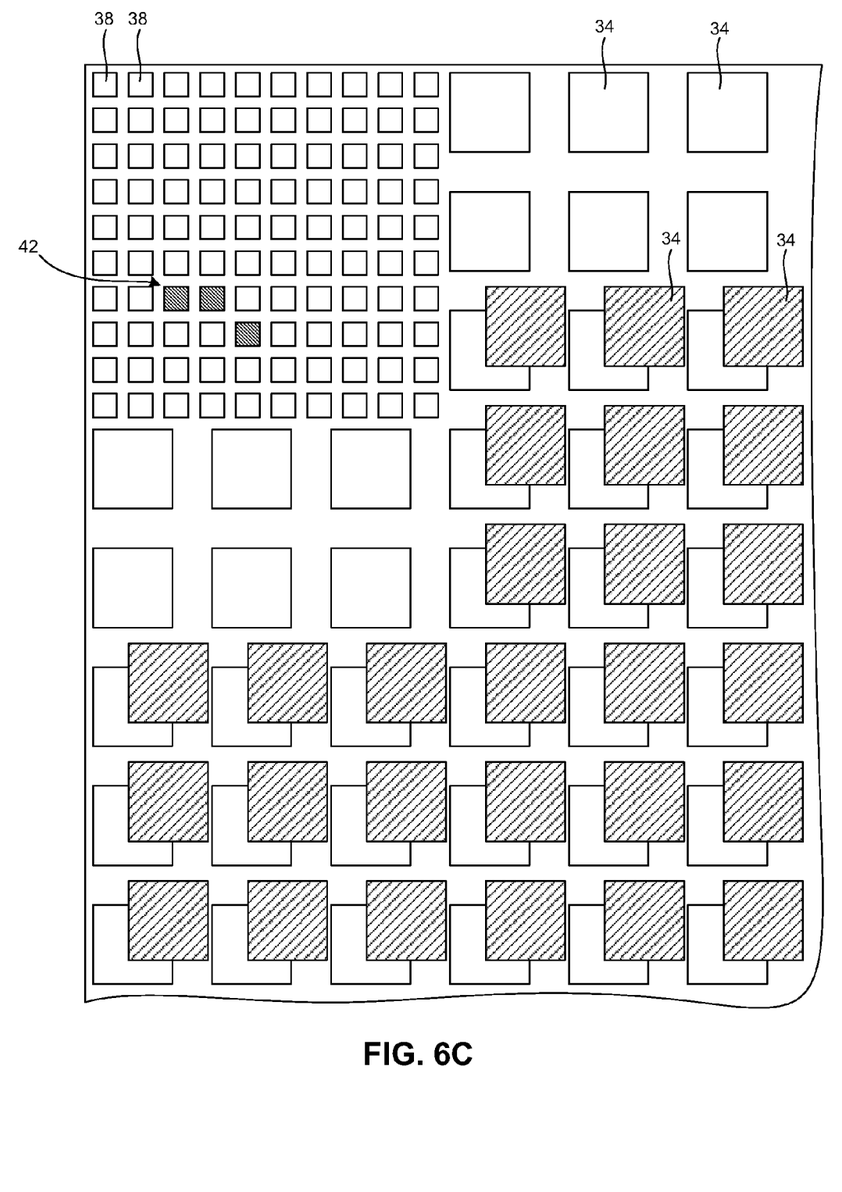

With additional reference to FIG. 6C, once the offset between the first image and the second image is determined, the image data from the second image may be aligned with respect to the image data of the first image (e.g., the second image may be brought into registration with the first image). De-skewing of the image data may also be made in the case of rotation of the image data of the second image relative to the image data of the first image. In one embodiment, de-skewing may be carried out, and then image alignment may be carried out.

In the illustrated example, the alignment entails shifting the image data for the image capture component 32 to the right by one pixel pitch of the image alignment component 36 and downward by six pixel pitches of the image alignment component 36. This aligns the alignment feature 42 for both images, but due to the different pixel densities between the image alignment component 36 and the image capture component 32, there is a residual offset in respective image data sets from the image capture component 32. Again, for purposes of distinguishing image data of the second image from the image data of the first image, the image data of the second image and generated by the image capture component 32 is shown using upper-right to lower-left cross-hatching.

In effect, the outcome of the alignment process is an interim image that is constructed in the memory 40. The interim image is a representation of the field of view of the camera assembly 12 at the time of taking the first image but having more pixels than that of the image sensor assembly 16. In the interim image, the fractional offset image from the second image is stored separately from the image data of the first image. For instance, if the sensor assembly 16 is a one megapixel sensor and the number of images taken to generate the final photograph is ten, the memory 40 may be configured to store one hundred megapixels so that images offset by 0.1 pixels of the image capture component 32 may be stored as the interim image.

Figure 6D:
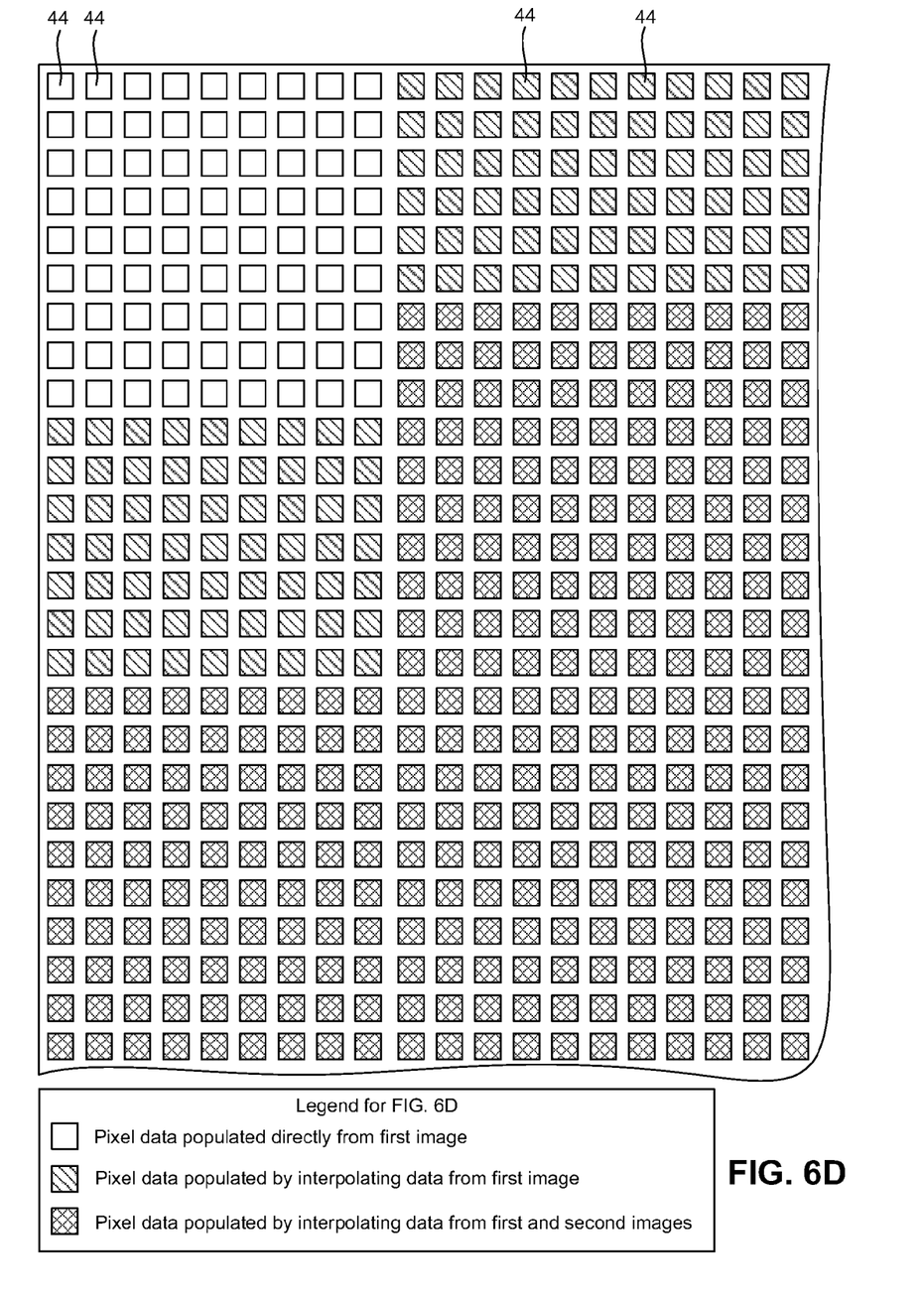

With additional reference to FIG. 6D, once the images are captured and aligned, the next step may be to combine the image data together to generate the output photograph. For this purpose, the memory 40 may be configured to have a pixel 44 density that is the same as (or have other correspondence to) the photo sensor 38 density of the image alignment component 36 of the sensory assembly 16. To construct the photograph, image data from the first image and that was generated by the high density photo sensors 38 of the image alignment component 36 may be directly used in the photograph to populate corresponding pixel data. This is illustrated by the unshaded pixels 44 of FIG. 6D. A filtering process may be used to populate the remaining pixels from the image data sets from the image capture component 32. For instance, where there is no overlap between image data generated by the image capture component 32 for the first and second images (and any subsequent images), the image data from the first image may be interpolated and/or up-sampled to populate corresponding pixels 44 of the photograph. This is illustrated by the upper-left to lower-right cross-hatched pixels 44 in FIG. 6D. Also, where there is overlap between image data generated by the image capture component 32 for the first and second images (and any subsequent images), the image data from the first and second images may be interpolated to populate corresponding pixels 44 of the photograph. This is illustrated by lattice-hatched pixels in FIG. 6D. In another embodiment, all of the pixels of the output photograph may be populated using image data from the image capture component 32 (e.g., image data from the image alignment component 36 is not used to populate corresponding pixel data in the output photograph).

In one embodiment, the size of the photo sensors 34 is selected so that relative fast exposure times may be used to capture each image and still produce a high signal to noise ratio in the corresponding output image data. The larger the size of each photo sensor 34, the more light energy may be incident on the photo sensor 34. As a result, analog amplitudes of the output signal from the photo sensor 34 may be corresponding high. It is this amplitude information that may be used for the interpolation to generate the photograph from plural images. Normally, photo sensor size is made small to increase resolution. But in the described approach, the photo sensor size may be large to capture relatively more light and deliver high resolution due to the use of image data that falls between the pixels of image data from the first image.

In the foregoing embodiment, image data from the image alignment component 36 contributes both to alignment and to part of the photograph. In other embodiments, the image alignment component 36 may not contribute image data for the photograph. Further, it is possible that the image alignment component 36 may be separated from the image capture component.

Figure 7:
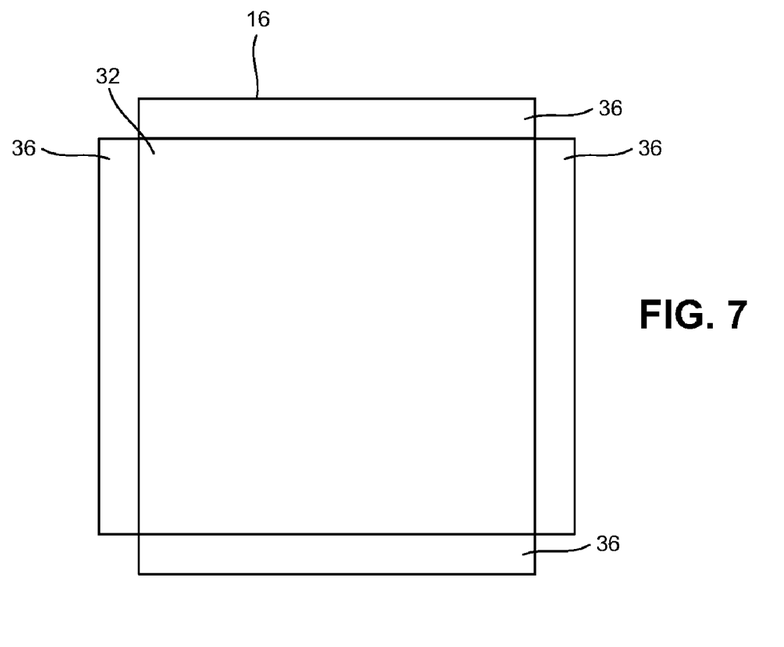
FIG. 7 is a schematic view of a second exemplary sensor assembly for the camera assembly.

For instance, with additional reference to FIG. 7, another exemplary embodiment of the sensor assembly 16 is shown. In this embodiment, the image alignment component 36 forms at least one collection of pixels next to each side of the image capture component 32. In one embodiment, the image alignment component 36 forms a single row of pixels along the top of the image capture component 32, a single row of pixels along the bottom of the image capture component 32, a single column of pixels along the left edge of the image capture component 32 and a single column of pixels along the right edge of the image capture component 32. In another embodiment, the image alignment component 36 forms multiple rows of pixels along the top of the image capture component 32, multiple rows of pixels along the bottom of the image capture component 32, multiple columns of pixels along the left edge of the image capture component 32 and multiple columns of pixels along the right edge of the image capture component 32. The multiple rows and columns may assist in reducing the possibility that shifting from image to image moves alignment features outside the area of the image alignment component 36. In either case, the pixels of the image alignment component 36 may be arranged with a higher density per unit area than the pixels of the image capture component 36. Therefore, the effective resolution of the image alignment component 36 is higher than the effective resolution of the image capture component 32.

Figure 8:
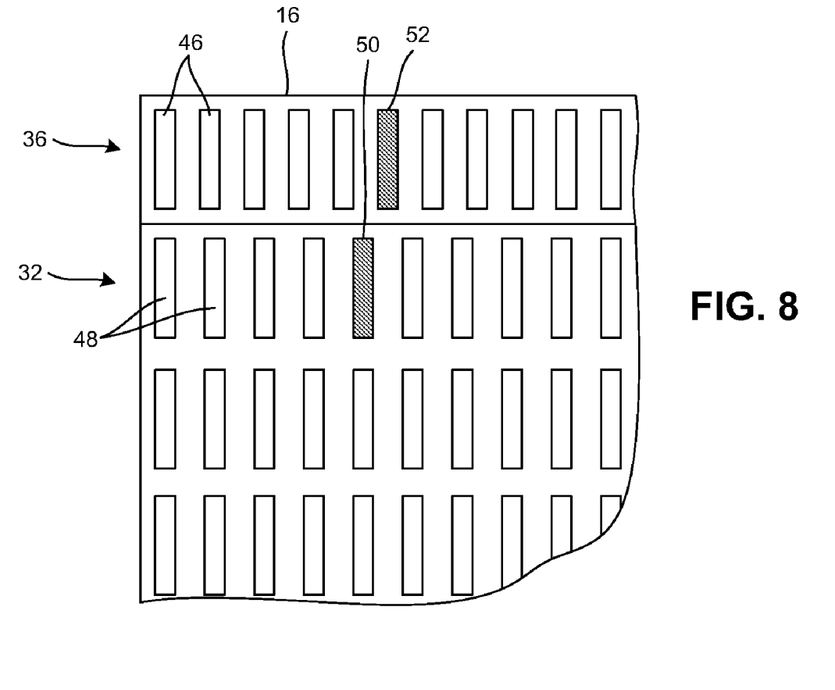
FIG. 8 is an enlarged view of a portion of the sensor assembly of FIG. 7.

With additional reference to FIG. 8, an enlarged portion of one exemplary implementation of the sensor assembly 16 of FIG. 7 is shown. In this embodiment, a row of pixels from the image alignment component 36 that is adjacent the image capture component 32 is a single linear array of light sensors 46 located adjacent a top row of light sensors 48 in the image capture component 36. The light sensors 46 may be spaced so that there are eleven light sensors 46 placed in the linear distance of ten light sensors 48 from the image capture component 38. In this arrangement the image alignment component 36 forms a Vernier sensing element. Also, the density of the light sensors 46 is greater than the density of the light sensors 48, but each light sensor 46, 48 has the approximately the same size. If desired, the Vernier sensing element may have multiple rows of light sensors 46 that alternate in number from eleven (as shown) to ten, then eleven, then ten and so forth as the rows move away from the image capture component 32. The juxtaposition of the photo sensors 46 that are arranged as a Vernier sensing element with the photo sensors 48 of the image capture component 32 allows for determinations to be made in the movement of the sensor assembly 16 from image to image.

Similar to the embodiment described in connection with FIGS. 5 and 6A-6D, the capturing of the first image may be followed quickly by the capturing of the second image. The location of a unique feature that is identified among the pixels at the edge of the image capture component (e.g., shaded pixel 50 in FIG. 8) from the first image may be compared against the location of same unique feature as appearing in image alignment component 32 (e.g., shared pixel 52 in FIG. 8) in the second image. From the relative locations of the feature, a determination may be made as to how much and in which directions the sensor assembly 16 moved from the capturing of the first image to the capturing of the second image. In the illustrated embodiment, the feature moved upward about one vertical pixel pitch of the image capture component 32 and to the right about half a pixel pitch of the image capture component 32. It is noted that prior to determining fractional pixel pitch shifts, integer pixel pitch shifts may first be determined and removed. Determining integer pixel pitch shifts may be made by comparing features found within the field of the pixels 48 for both images. Removing the integer pixel pitch shifts may be accomplished by shifting the second image by a corresponding number of integer pixel pitches of the image capture component 32 toward the location of the feature in the first image.

As will be appreciated, the eleven photo sensors 46 of the image alignment component 32 next to ten pixels 48 of the image capture component 32 allows for horizontal shift determinations to made to an accuracy of 0.1 pixels. Vertical shift may be determined to a similar accuracy using similar arrangements on lateral edges of the image capture component 32. Rotation may be determined as a function of horizontal and vertical shift of plural unique features at multiple locations around the perimeter of the image capture component 32.

From determining the relative movement from image to image, offset information may be used to align the image data from the respective images captured with the image capture component 32, but with residual offset as described above. The aligned image data is then interpolated to create the photograph.

Figure 9:
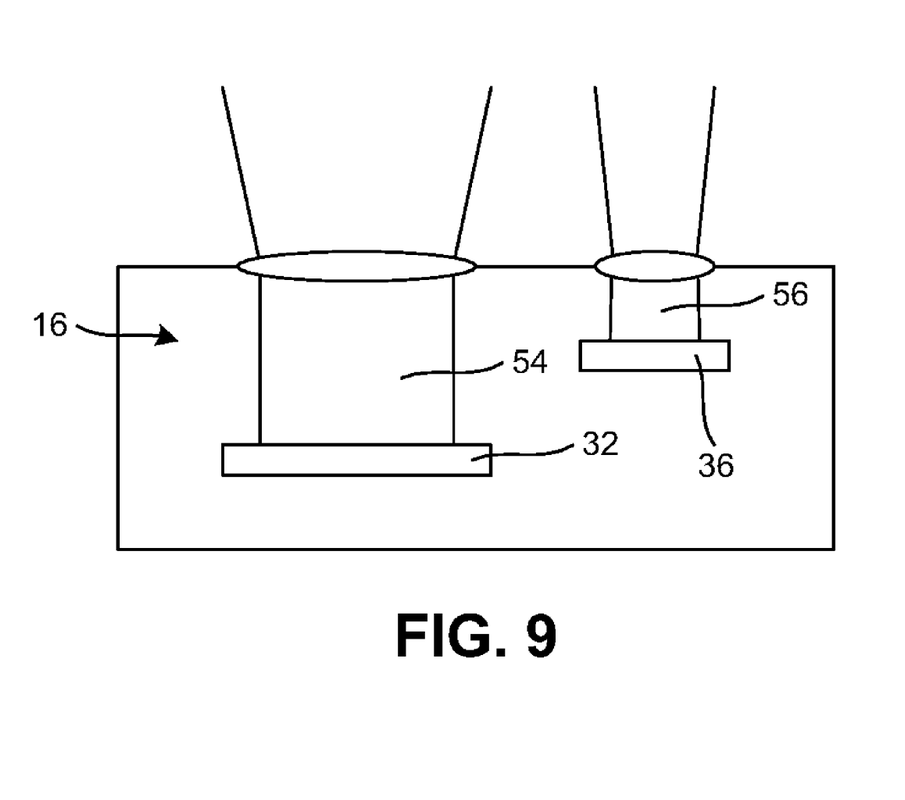
FIG. 9 is a schematic view of a third exemplary sensor assembly for the camera assembly.

With additional reference to FIG. 9, shown is another example of an embodiment where the image alignment component 36 of the sensor assembly 16 is separate from the image capture component 32. In the embodiment of FIG. 9, a primary optical path 54 focuses light from the scene onto the image capture component 32 and a secondary optical path 56 focuses light from the scene on to the image alignment component 36. The secondary optical path 56 may have a higher magnification and a smaller field of view than the primary optical path 54. In one embodiment, the image resolution component 36 may have the same physical resolution as the image capture component 32. Alternatively, the image capture component 32 may have a higher density of light sensors per unit area than the image capture component 32. In both cases, and similar to the above-described embodiments, the image data from the image alignment component 36 has a higher effective resolution than the image data from the image capture component.

During capturing of each image, image data is captured with both the image capture component 32 and the image alignment component 36. The relative locations of features in the image data from the image alignment component 36 for each image are compared to determine relative movement from image to image. Using this offset information, the image data from the respective images captured with the image capture component 32 are aligned, but with residual offset as described above. The aligned image data is then interpolated to create the photograph.

In each of the foregoing exemplary embodiments, the higher resolution image alignment component 36 provides offset information for the image data from successive images taken with the image capture component 32. This information may be used to relate successive images to each other and to align the image data. But due to the differences in resolution in the sensor assembly components, the alignment for the image data from the image capture component 32 from one image to the next will have a residual offset (unless the original offset was an integer multiple of the pixel pitch of the image capture component). Using the overlaid image data from the image capture component 32 from plural images, a photograph may be generated by interpolating the overlaid image data. In effect, normally occurring blur from one image to the next is used to increase the resolution of the output photograph relative to the native resolution capacity of the image capture component 32.

As indicated, the illustrated electronic device 10 shown in FIGS. 1 and 2 is a mobile telephone. Features of the electronic device 10, when implemented as a mobile telephone, will be described with additional reference to FIG. 3.

As indicated, the electronic device 10 may include the display 22. The display 22 displays information to a user such as operating state, time, telephone numbers, contact information, various menus, etc., that enable the user to utilize the various features of the electronic device 10. Also, the keypad 26 and/or buttons 28 may provide for a variety of user input operations, including call operations, messaging operations, Internet browsing, menu navigation, game playing, multimedia content playback and so forth.

The electronic device 10 may include call circuitry that enables the electronic device 10 to establish a call and/or exchange signals with a called/calling device, which typically may be another mobile telephone or landline telephone. However, the called/calling device need not be another telephone, but may be some other device such as an Internet web server, content providing server, etc. Calls may take any suitable form. For example, the call could be a conventional call that is established over a cellular circuit-switched network or a voice over Internet Protocol (VoIP) call that is established over a packet-switched capability of a cellular network or over an alternative packet-switched network, such as WiFi (e.g., a network based on the IEEE 802.11 standard), WiMax (e.g., a network based on the IEEE 802.16 standard), etc. Another example includes a video enabled call that is established over a cellular or alternative network.

The electronic device 10 may be configured to transmit, receive and/or process data, such as text messages, instant messages, electronic mail messages, multimedia messages, image files, video files, audio files, ring tones, streaming audio, streaming video, data feeds (including podcasts and really simple syndication (RSS) data feeds), and so forth. Processing data may include storing the data in a memory 58, executing applications to allow user interaction with the data, displaying video and/or image content associated with the data, outputting audio sounds associated with the data, and so forth.

The electronic device 10 may include the primary control circuit 30 that is configured to carry out overall control of the functions and operations of the electronic device 10. As indicated, the control circuit 30 may be responsible for controlling the camera assembly 12.

The control circuit 30 may include a processing device 60, such as a central processing unit (CPU), microcontroller or microprocessor. The processing device 60 may execute code that implements the various functions of the electronic device 10. The code may be stored in a memory (not shown) within the control circuit 30 and/or in a separate memory, such as the memory 58, in order to carry out operation of the electronic device 10. It will be apparent to a person having ordinary skill in the art of computer programming, and specifically in application programming for mobile telephones or other electronic devices, how to program a electronic device 10 to operate and carry out various logical functions.

Among other data storage responsibilities, the memory 58 may be used to store photographs that are generated by the camera assembly 12. Images used to generate the photographs also may be temporarily stored by the memory 58, rather than the memory 40

Continuing to refer to FIG. 3, the electronic device 10 includes an antenna 62 coupled to a radio circuit 64. The radio circuit 64 includes a radio frequency transmitter and receiver for transmitting and receiving signals via the antenna 62. The radio circuit 64 may be configured to operate in a mobile communications system and may be used to carryout calls and to send and receive data and/or audiovisual content. Receiver types for interaction with a mobile radio network and/or broadcasting network include, but are not limited to, global system for mobile communications (GSM), code division multiple access (CDMA), wideband CDMA (WCDMA), general packet radio service (GPRS), WiFi, WiMax, digital video broadcasting-handheld (DVB-H), integrated services digital broadcasting (ISDB), etc., as well as advanced versions of these standards. It will be appreciated that the antenna 62 and the radio circuit 64 may represent one or more than one radio transceivers.

The electronic device 10 further includes a sound signal processing circuit 66 for processing audio signals transmitted by and received from the radio circuit 64. Coupled to the sound processing circuit 66 are a speaker 68 and a microphone 70 that enable a user to listen and speak via the electronic device 10 as is conventional. The radio circuit 64 and sound processing circuit 66 are each coupled to the control circuit 30 so as to carry out overall operation. Also, the display 22 may be coupled to the control circuit 30 by a video processing circuit 72 that converts video data to a video signal used to drive the display 22.

The electronic device 10 may further include one or more I/O interface(s) 74. The I/O interface(s) 74 may be in the form of typical mobile telephone I/O interfaces and may include one or more electrical connectors. As is typical, the I/O interface(s) 74 may be used to couple the electronic device 10 to a battery charger to charge a battery of a power supply unit (PSU) 76 within the electronic device 10. In addition, or in the alternative, the I/O interface(s) 74 may serve to connect the electronic device 10 to a headset assembly (e.g., a personal handsfree (PHF) device) that has a wired interface with the electronic device 10. Further, the I/O interface(s) 74 may serve to connect the electronic device 10 to a personal computer or other device via a data cable for the exchange of data. The electronic device 10 may receive operating power via the I/O interface(s) 74 when connected to a vehicle power adapter or an electricity outlet power adapter. The PSU 76 may supply power to operate the electronic device 10 in the absence of an external power source.

Other components that are commonly found in mobile telephones 10 may be present, such as a system clock, a position data receiver (e.g., a global positioning system (GPS) receiver), a local wireless interface (e.g., an infrared transceiver and/or an RF transceiver, such as a Bluetooth transceiver), etc.

Figure 4:
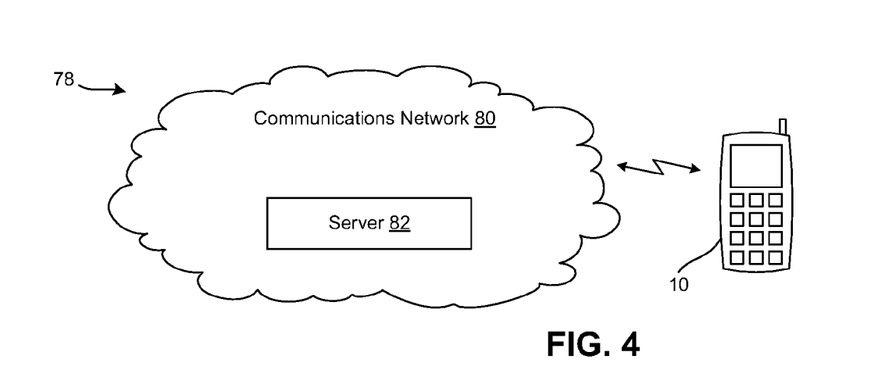
FIG. 4 is a schematic diagram of a communications system in which the electronic device of FIGS. 1 and 2 may operate.

With additional reference to FIG. 4, the electronic device 10 may be configured to operate as part of a communications system 78. The system 78 may include a communications network 80 having a server 82 (or servers) for managing calls placed by and destined to the electronic device 10, transmitting data to the electronic device 10 and carrying out any other support functions. The server 82 communicates with the electronic device 10 via a transmission medium. The transmission medium may be any appropriate device or assembly, including, for example, a base station (e.g., a cellular tower), another mobile telephone, a wireless access point, a satellite, etc. The network 80 may support the communications activity of multiple electronic devices 10 and other types of end user devices. As will be appreciated, the server 82 may be configured as a typical computer system used to carry out server functions and may include a processor configured to execute software containing logical instructions that embody the functions of the server 82 and a memory to store such software.

Although certain embodiments have been shown and described, it is understood that equivalents and modifications falling within the scope of the appended claims will occur to others who are skilled in the art upon the reading and understanding of this specification.

What is claimed is:

1. A camera assembly, comprising:
   a sensor assembly that includes an image capture component and an image alignment component, the image alignment component located at a periphery of the image capture component, the image alignment component having a higher density of photo sensors per unit area and higher effective resolution than the image capture component; and
   a controller that controls the generation of an output photograph, the controller configured to:
      control the sensor assembly to capture at least two images, wherein there is a time delay between the capture of each image and each image comprises:
         image data captured by the image capture component; and
         alignment data captured by the image alignment component;
      identify at least one alignment feature in the image data or the alignment data corresponding to a first of the images;
      identify the at least one alignment feature in the alignment data corresponding to a second one of the images and determine an offset between the first and second images from corresponding locations of the alignment feature in the first and second images;
      align the first and second images to remove offset corresponding to an integer multiple of a predetermined pixel pitch and leave an offset amount corresponding to a residual fraction of the pixel pitch; and
      combine the image data for the first image with the image data for the second image.

2. The camera assembly of claim 1, wherein the resolution of the output photograph is greater than a native resolution of the image capture component.

3. The camera assembly of claim 1, wherein the image data is combined using interpolation.

4. The camera assembly of claim 1, wherein a pitch of photo sensors of the image capture component is a multiple of a pitch of photo sensors of the image alignment component.

5. The camera assembly of claim 1, wherein the predetermined pixel pitch is a pitch of photo sensors of the image alignment component.

6. The camera assembly of claim 1, wherein the image data from the image alignment component for the first image populates a corresponding portion of the output photograph.

7. The camera assembly of claim 1, further comprising a memory having a pixel resolution for the output photograph that is a function of a resolution of the image alignment component, the controller populating the memory with the combination of the image data from the captured images.

8. The camera assembly of claim 1, wherein the identified alignment feature from the first image is from the image data output by the image alignment component.

9. The camera assembly of claim 1, wherein the image alignment component is a Vernier sensing element located adjacent the image capture component.

10. The camera assembly of claim 9, wherein the predetermined pixel pitch is a pitch of photo sensors of the image capture component.

11. The camera assembly of claim 9, wherein the identified alignment feature from the first image is from the image data output by the image capture component.

12. The camera assembly of claim 1, wherein the image alignment component and the image capture component have different optical pathways to focus light from a scene respectively onto the image alignment component and the image capture component.

13. The camera assembly of claim 12, wherein the optical pathway for the image alignment component has a higher magnification than the optical pathway for the image capture component.

14. The camera assembly of claim 12, wherein the predetermined pixel pitch is a pitch of photo sensors of the image alignment component.

15. A method of generating a photograph, comprising:
   controlling a sensor assembly to capture at least two images, wherein there is a time delay between the capture of each image, the sensor assembly having an image capture component and an image alignment component, the image alignment component located at a periphery of the image capture component, and the image alignment component having a higher density of photo sensors per unit area and higher effective resolution than the image capture component, wherein each image comprises:
      image data captured by the image capture component; and
      alignment data captured by the image alignment component;
   identifying at least one alignment feature in the image data or the alignment data corresponding to a first of the images;
   identifying the at least one alignment feature in the alignment data corresponding to a second one of the images and determining an offset between the first and second images from corresponding locations of the alignment feature in the first and second images;
   aligning the first and second images to remove offset corresponding to an integer multiple of a predetermined pixel pitch and leave an offset amount corresponding to a residual fraction of the pixel pitch; and
   combining the image data for the first image with the image data for the second image.

16. The method of claim 15, wherein the image alignment component is a Vernier sensing element located adjacent the image capture component.

17. The method of claim 15, wherein the image alignment component and the image capture component have different optical pathways to focus light from a scene respectively onto the image alignment component and the image capture component.

* * * * *